Nov. 3, 1953   R. R. TEETOR   2,657,598
KNURLING MACHINE
Filed Feb. 6, 1948   4 Sheets-Sheet 1
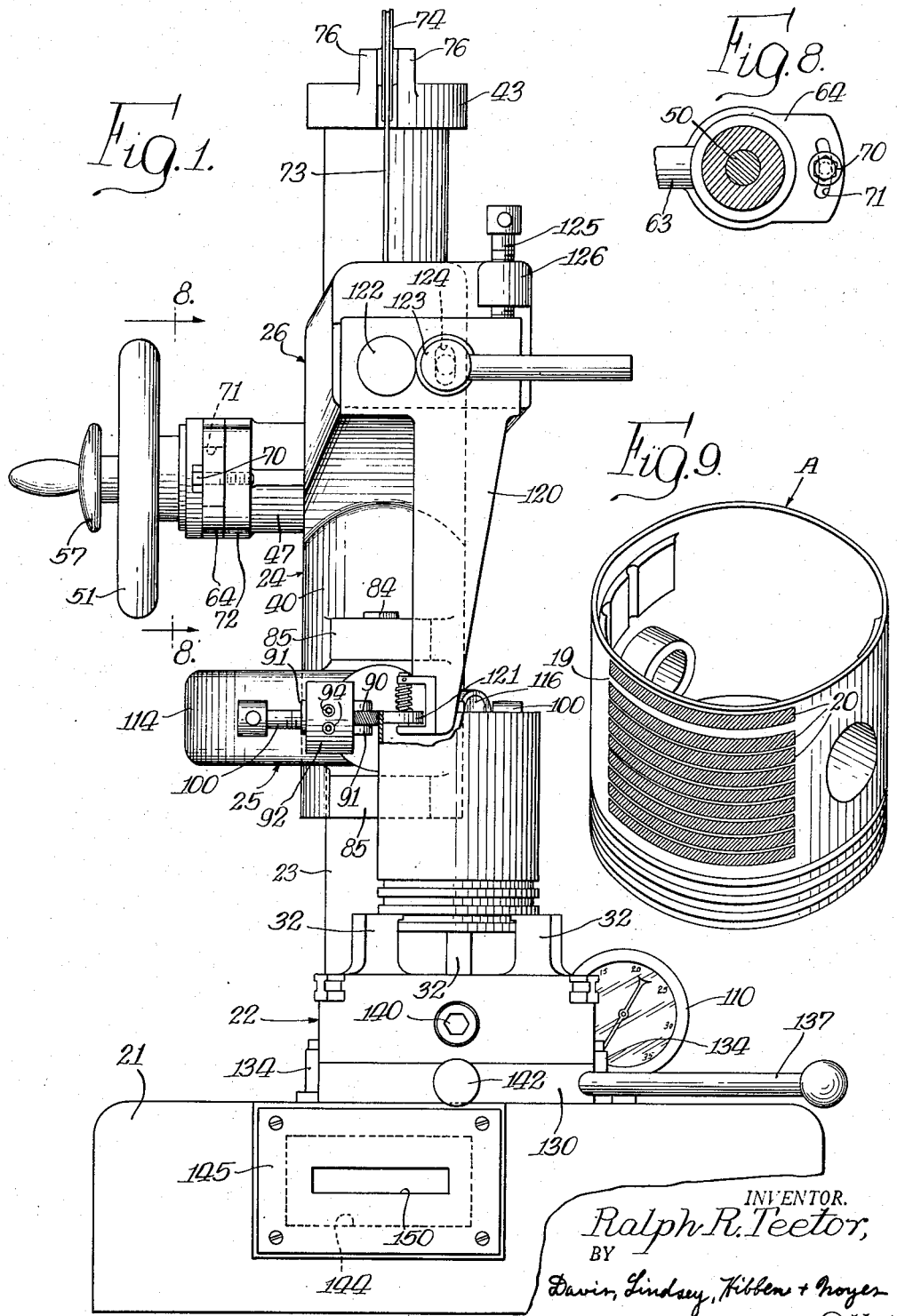
INVENTOR.
Ralph R. Teetor,
BY
Davis, Lindsey, Hibben + Noyes
Atty's

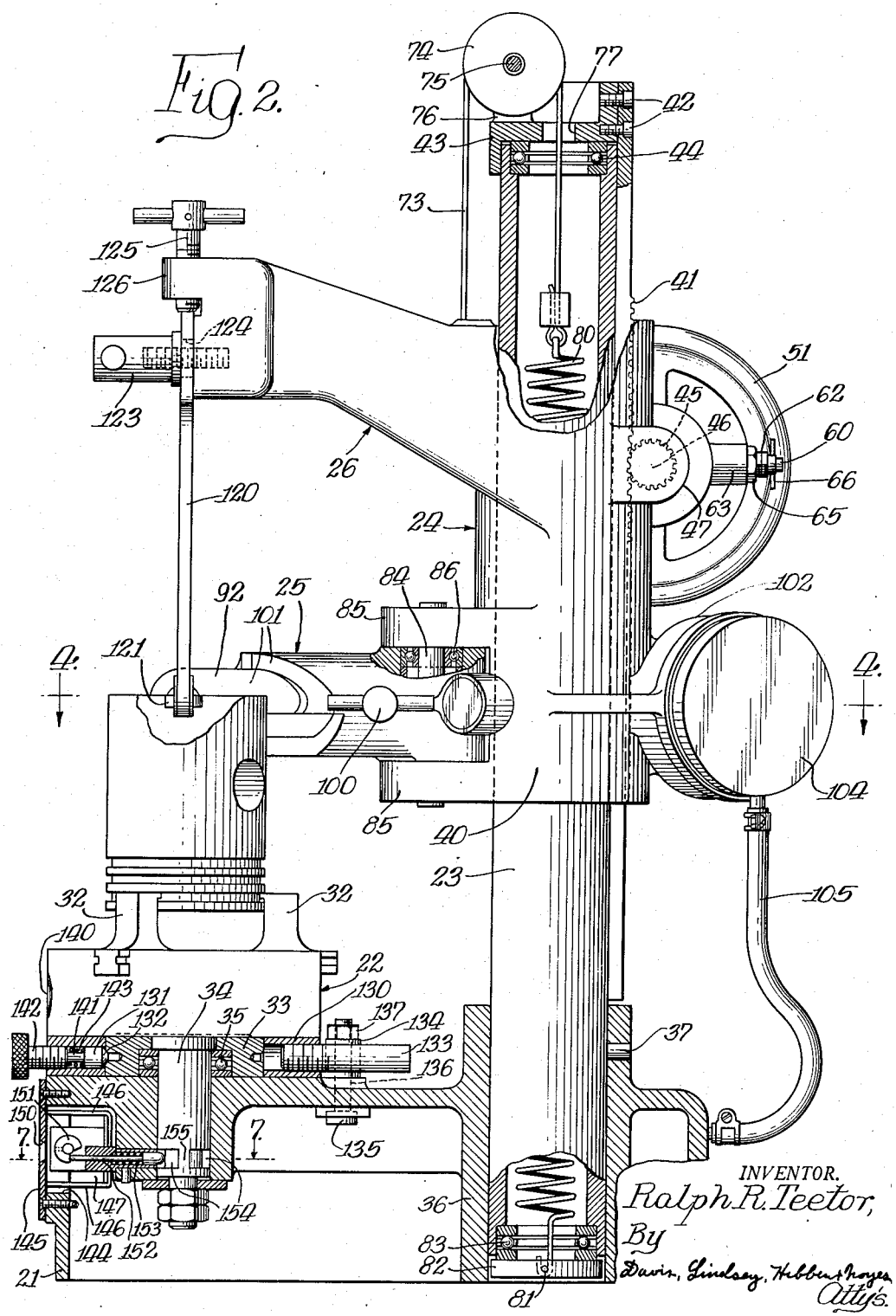

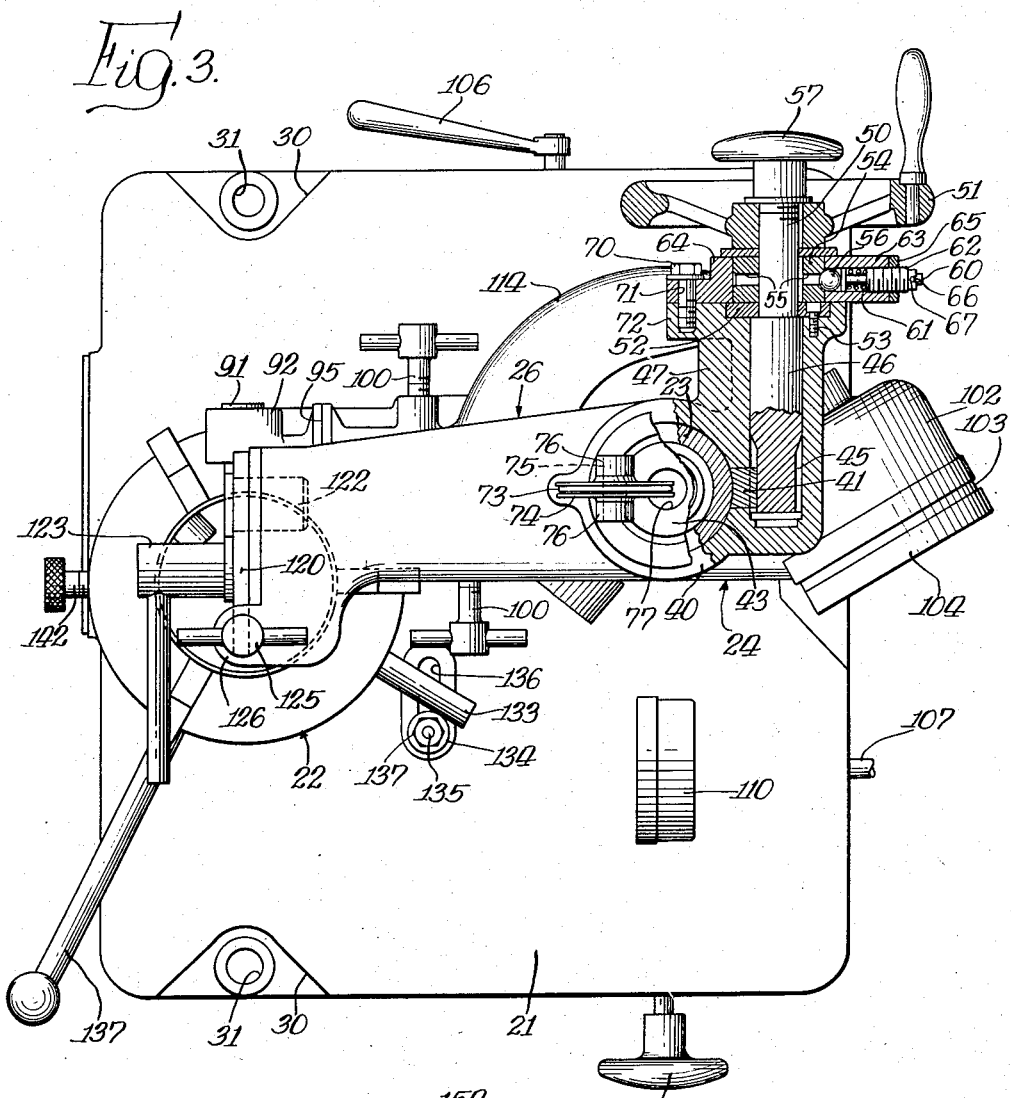
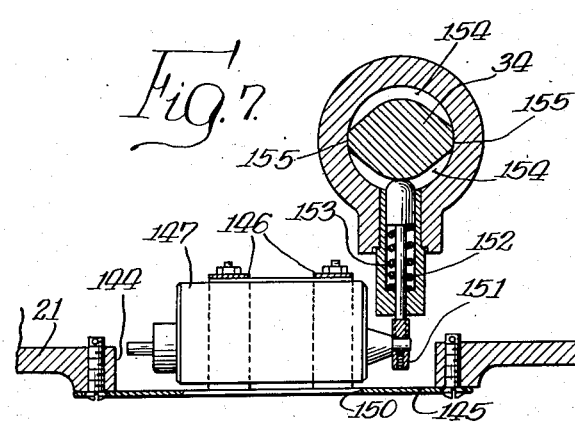

Nov. 3, 1953  R. R. TEETOR  2,657,598
KNURLING MACHINE
Filed Feb. 6, 1948  4 Sheets-Sheet 4
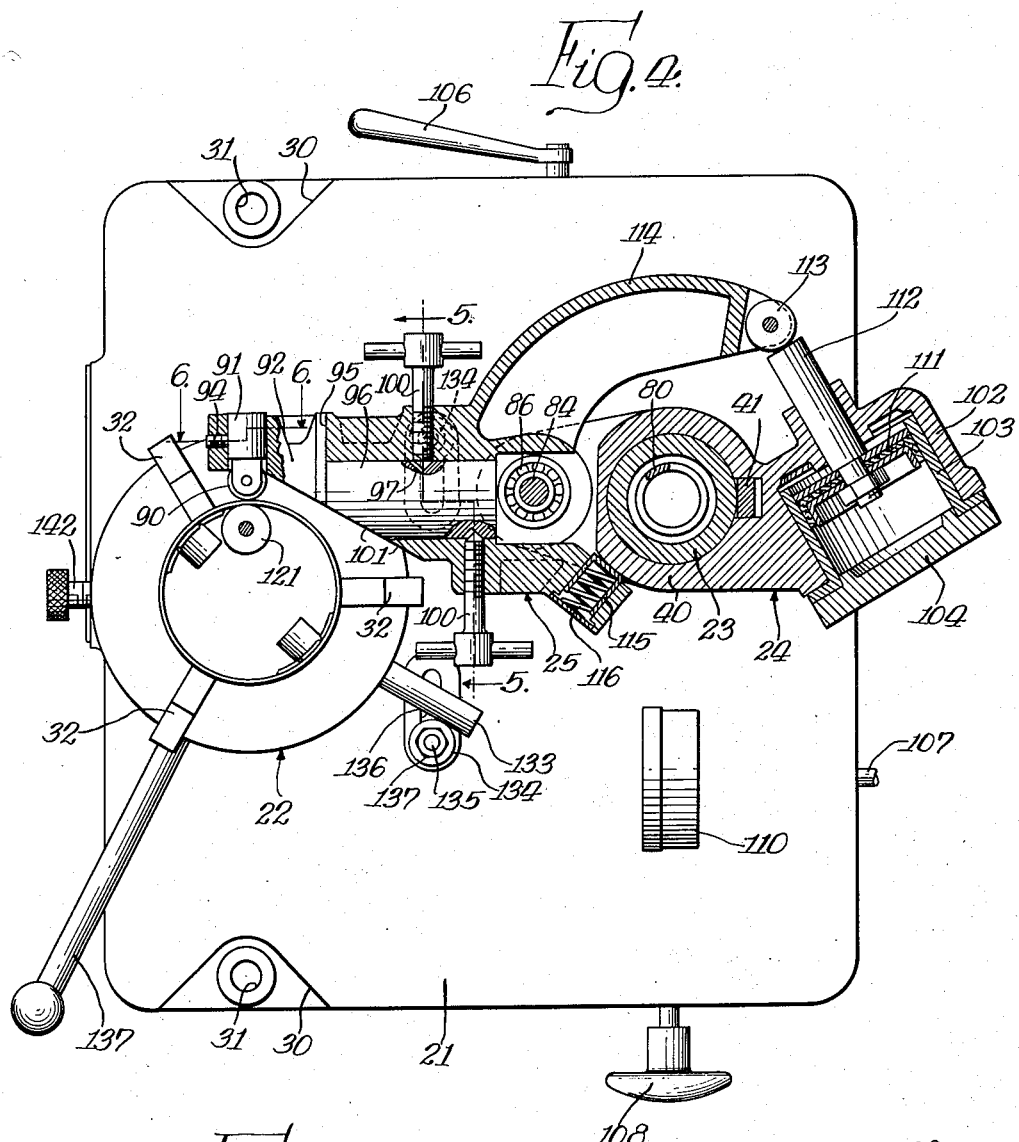
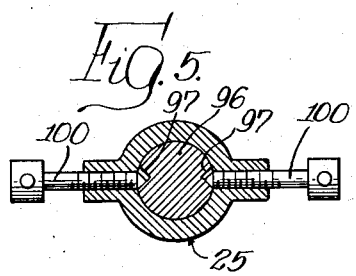
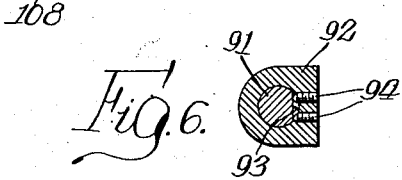
INVENTOR.
Ralph R. Teetor,
BY
Davis, Lindsey, Hibben + Noyes
Attys.

Patented Nov. 3, 1953

2,657,598

UNITED STATES PATENT OFFICE 2,657,598

KNURLING MACHINE

Ralph R. Teetor, Hagerstown, Ind., assignor to Perfect Circle Corporation, Hagerstown, Ind., a corporation of Indiana Application February 6, 1948, Serial No. 6,635

5 Claims. (Cl. 80—5.1)

The invention relates generally to knurling machines and more particularly to a machine for knurling the peripheral surface of cylindrical objects. In its more detailed aspects, the invention relates to a machine for knurling predetermined areas on the peripheral surface of a hollow cylindrical object such as a piston for an internal combustion engine.

The general object of the invention is to provide a novel knurling machine of the foregoing general character, which is of rugged but simple construction, which is easy to operate, and by which a high-grade job of knurling may be performed.

Another important object is to provide a novel knurling machine of the foregoing general character, the machine being of so-called bench type of construction and suitable for use in garages and general automobile repair shops.

A further object is to provide a novel knurling machine of the foregoing character, capable of use on a large variety of sizes of pistons and readily adjustable to accommodate such variety of sizes.

Still another object is to provide a novel machine for knurling predetermined areas on the periphery of the skirt of a piston with each area comprising a plurality of peripherally extending parallel bands of knurling, the machine being arranged to automatically provide bands of uniform peripheral length and axial spacing but being readily adjustable to permit change of peripheral length.

It is also an object to provide a knurling machine having novel means for knurling equal areas on opposite sides of the piston, the machine, when once adjusted for the area to be knurled, being arranged to permit shifting the piston to present its opposite side without readjustment of the machine.

A still further object is to provide a knurling machine of the foregoing character, which is provided with an automatically actuated counter to indicate the number of work pieces, such as pistons, that are knurled in the machine.

Other objects and advantages will become apparent from the following description taken in connection with the accompanying drawings in which:

Figure 1 is a front elevational view of a machine embodying the features of the invention.

Fig. 2 is a side elevational view, partially in section, of the machine shown in Fig. 1.

Fig. 3 is a plan view, partially in section.

Fig. 4 is a horizontal sectional view, taken on the line 4—4 of Fig. 2.

Figs. 5 and 6 are sectional views, respectively taken on the lines 5—5 and 6—6 of Fig. 4.

Fig. 7 is a fragmentary sectional view taken on the line 7—7 of Fig. 2.

Fig. 8 is a sectional view taken on the line 8—8 of Fig. 1.

Fig. 9 is a perspective view of a piston knurled on the present machine.

In the case of a cylindrical article reciprocably mounted in a bore, such as a piston in a cylinder of an internal combustion engine, it has been found that better lubrication can be obtained if one of the two contacting surfaces is of an interrupted nature, that is, a surface comprising projecting portions with intervening depressions. A surface of this character has been found to run cooler than an absolutely smooth surface for pistons as well as other cylindrical objects. Such a surface may be provided by knurling, the projections resulting from such knurling determining the diameter of the piston and constituting the surface contacting the bore of the cylinder. Such knurling may extend over the entire skirt area of the piston or it may be sufficient merely to knurl the thrust portions of the piston skirt, that is, those portions which are subjected to lateral thrust against the cylinder wall due to the position of the connecting rod during the power stroke of the engine.

The advantages of this character of surface may, of course, be obtained either in new pistons or by producing such a surface on used pistons. However, an additional advantage may be obtained in the case of used pistons in that the knurling of the surface of the piston may be employed to compensate for wear either in the cylinder or on the piston itself. Thus, by knurling the surface of the piston, the metal thereof may be extruded to a sufficient extent to cause the projections formed by the knurling to extend to the desired increased size. While the present machine is designed primarily for knurling pistons, the invention is not limited in this manner but covers the knurling of the peripheral surface of any cylindrical article.

The term "knurling," as used throughout the specification and claims, is not limited to the ordinary form of knurling which involves grooves arranged in a crisscross pattern. The term "knurling" in the present instance is used in a broad sense to include any surface formation involving alternate depressed and raised portions, regardless of whether one or the other of said portions are continuous throughout the area having such a surface. Thus, the term includes not only the crisscross pattern but also a pattern formed by parallel grooves or by isolated indentations resulting in connected raised or projecting portions.

As heretofore mentioned, the knurling may be performed only on that part of the surface of the piston which is subjected to thrust during operation of the engine. Thus, the knurling may be performed only on that part of the skirt lying intermediate the wrist-pin holes on opposite sides of the piston. The knurling tool is preferably in the form of a small roller applied in rolling relation to the surface to be knurled, so that the resultant area knurled by one application of such a tool has a width equal to the width of the roller. Preferably, the roller is relatively narrow and is rolled circumferentially on the article being knurled, so that, to cover an area of greater length along the piston or cylindrical article, a plurality of knurled bands are formed on the piston, which together make up the desired length for the knurled area. The knurled bands may, of course, be either in continuous relation to one another or slightly spaced longitudinally of the piston.

To illustrate such knurling, Fig. 9 shows a piston indicated generally at A and having on its skirt portion a plurality of knurled bands 20. Each of these bands is formed by one application of the knurling roller and, consequently, has a width equal to the width of the roller. The arcuate or circumferential length of each of the bands 20 may be determined by the setting of the machine, and the axial spacing or relation between adjacent bands is also controlled by the machine so that the resultant knurled area has both its circumferential dimension and its axial dimension controlled by the machine. While the piston shown in Fig. 9 discloses a knurled area only on one side of the piston, it is of course contemplated that an area of equal dimension is to be formed on the opposite side of the piston. The knurled area preferably starts at a line adjacent the ring grooves in the piston and may extend axially for the full length of the skirt. If desired, the spacing between the knurled band at the extreme end of the skirt, indicated at 19, may be slightly different from the spacing of the rest of the knurled bands, so as to bring the knurled band at the end of the skirt as close to the edge of the piston as possible.

The present knurling machine is of a type which is designed for use on a bench where it may be conveniently operated. In general, the machine may be said to comprise a base 21 on which a work holder, indicated generally at 22, is mounted. The work holder in the present instance is adapted to support the work for rotation about the axis thereof, with the axis extending vertically. The base 21 also carries a vertically extending column 23 for supporting a knurling unit, indicated generally at 24. The knurling unit 24 is mounted on the column 23 for adjustment both rotatably about the column and axially thereof so that the machine may be utilized with work pieces of different diameters and different lengths. The knurling unit comprises generally a hub portion mounted on the column 23, a tool supporting arm, indicated at 25, and a work supporting arm, indicated at 26, carrying an anvil adapted to enter the work and be applied to the interior thereof at the point of knurling, the knurling tool being applied, as has been mentioned, to the peripheral surface of the work pieces. The location of the various knurled bands 20 on the work is determined by movement of the knurling unit 24 axially of the column 23, while the arcuate or circumferential length of each knurled band 20 is determined by rotative or rocking movement of the work holder 22. The rotation of the work holder 22 is also utilized to present diametrically opposite areas to the knurling roller, and, for this purpose, it is so mounted that it may be indexed through 180°. The present machine further includes a counting device for indicating the number of work pieces knurled on the machine and, to this end, the indexing movement of the workholder 22 is utilized to actuate the counter.

Referring to the particular embodiment of the machine shown in the drawings, the base 21 is generally rectangular in form and comprises a rigid casting firmly supporting other parts of the machine. The base may be provided with depressions 30 at opposite sides (see Figs. 3 and 4) to receive bolts extending through holes 31 to bolt the machine to a bench. Located adjacent the front edge of the base 21 is the work holder 22, which, in the present instance, is in the form of a three-jawed chuck, the jaws being indicated at 32. The jaws 32 are, of course, adjustable to accommodate work pieces of different diameters and, in the case of pistons, are adapted to grasp the piston at the head or grooved end thereof, as clearly illustrated in Figs. 1 and 2. The chuck is mounted on an adapter 33, to which is secured a shaft 34 (see Fig. 1) extending downwardly into the base 21. To facilitate rotation of the work holder 22, the shaft 34 is supported in an anti-friction bearing 35. The work holder 22 is thus free to be rotated about the axis of the work to determine the circumferential length of the knurled bands and to present diametrically opposite sides of the work pieces to the knurling tool.

The column 23 is in the form of a cylindrical tube having its lower end supported in the base 21. To provide adequate support for the column, the base is provided with an elongated, vertically extending hub 36 in which the column 23 has a press fit. To insure holding the column 23 against turning in the base, a drive pin 37 extends radially through the hub 36 into the column 23. The column 23 is thus securely locked to the base structure and is rigidly supported in a vertical position, the axis of the column thus extending parallel to the axis of the work piece when the latter is mounted in the work holder 22.

As mentioned above, the knurling unit includes both a tool supporting arm 25 and a work supporting arm 26. These arms extend from a hub portion 40 with the tool supporting arm 25 swingable on the hub portion 40 for moving the tool into and out of engagement with the work while the work supporting arm 26 is rigid with the hub portion 40. The hub portion 40 embraces the column 23 for a substantial length so as to provide rigid support for the arms 25 and 26. The knurling unit as a whole is adapted to be swung about the axis of the column 23 to adjust the tool and work support for work pieces of different diameters. The knurling unit also is adapted to be movable longitudinally of the column 23 to provide for work pieces of different lengths, as well as to provide for application of the knurling tool at points axially spaced on the work whereby the various knurled bands formed may be formed on the peripheral surface of the work. The knurling unit is preferably counterbalanced so that it may be readily adjusted to any desired vertical position on the column 23.

For vertical adjustment of the knurling unit, an indexing device is provided, utilizing a rack and pinion for effecting the vertical movement of the unit 24. Thus, I provide a rack 41 (see Figs. 2 and 3) lying flat against the side of the column 23 and extending longitudinally thereof. The rack 41 extends into the hub portion 40 of the unit so that, when the unit is rotated or swung about the column 23, the rack 41 must also move about the column. The rack 41, however, is held against movement longitudinally of the column 23. To effect this result, the rack 41, at its upper end, is secured, as by screws 42, to a cap 43 mounted on the upper end of the column. The cap is rotatably carried by the upper end of the column 23 and, to facilitate relative rotation therebetween, an anti-friction bearing 44 is provided.

Meshing with the rack 41 is a pinion 45 (see Figs. 2 and 3) formed on the inner end of a stub shaft 46 journaled in a lateral extension 47 on the hub portion 40 of the knurling unit. To properly space the knurled bands on the work, an indexing mechanism is provided to cooperate with the rotary movement of the pinion shaft 46. However, with different size work pieces, the location of the starting points of such bands may differ. Consequently, while the indexing mechanism provides for equal spacing of the bands, the location at which the indexing takes place may be varied. To meet these requirements, the shaft 46 has a reduced outer end 50, on which a handwheel 51 is mounted for turning the shaft 46. To hold the shaft 46 against endwise movement in the extension 47, a thrust plate 52 is mounted on the reduced portion 50 against the shoulder formed by such reduced portion, and the thrust plate 52 is rigidly secured to the extension 47, as by a screw 53. Mounted on the reduced portion 50 between the hub of the handwheel 51 and the plate 52 is an index collar 54 keyed to the reduced portion 50. The index collar 54 is provided with a plurality of radially extending holes 55 adapted to receive a spring-pressed detent in the form of a ball 56. The holes or depressions 55 are equally spaced about the index collar 54 so that rotation of the shaft 46 to shift the detent 56 from one hole 55 to the next effects vertical indexing movement of the knurling unit 24 in equal increments. After each indexing movement, the entire assembly may be locked against rotative movement of the shaft 46 by a clamping nut provided with a hand knob 57 threaded on the end of the reduced portion 50 of the shaft 46. The clamping nut thus clamps the hub of the handwheel and the indexing collar 54 tightly against the plate 52 to prevent relative rotation between these parts.

For most knurling operations, it is desired to have the knurled bands equally spaced so that the indexing device, as heretofore described, is utilized to effect such equal spacing. There are instances, however, when it is desired to deviate from the standard spacing. For instance, if it is desired to place the last knurled band adjacent the skirt end of the piston at a different spacing from the adjacent band, the indexing mechanism may be rendered inoperable and the knurling unit locked in another desired position. To this end, the detent or ball 56 is urged against the indexing collar 54 by a plunger 60 pressed inwardly by a spring 61. The plunger 60 is slidably mounted in a screw 62 threaded into a lateral boss 63 formed on an adjusting plate 64 embracing the indexing collar 54. The screw 62 may be adjusted to vary the pressure of the spring 61 and is adapted to be held in adjusted position by a jam nut 65. When it is desired to eliminate the indexing feature, the plunger 60 may be pulled outwardly by a cross pin 66 in its end and turned through 90° to hold the cross pin out of a transverse notch 67 formed in the end of the screw 62. The plunger 60 will thus be held in an outward position, relieving pressure on the ball 56. However, when the cross pin 66 is turned into alignment with the notch 67, the spring 61 presses the inner end of the plunger against the ball 56 to force it into one of the holes 55 in the indexing collar 54, when the ball 56 is aligned with such hole. With the pressure relieved on the ball 56, the indexing collar 54 may be turned to any position and locked in place by the clamping nut 57. A spacing differing from that provided by the indexing collar 54 may, therefore, be provided for the position of the knurling tool when applied to the work piece.

With pistons of different lengths, the point at which the knurling is to start may vary. It is, therefore, desirable to be able to adjust the position of the knurled band nearest the grooves in the piston and thereafter utilize the indexing mechanism for providing the proper spacing between the bands. To this end, the locking plate 64 may be rotatably adjusted. Thus, as shown in Figs. 3 and 8, the locking plate 64 may be turned about the axis of the shaft 46 to a limited extent and rigidly secured to the extension 47 by means of a screw 70 extending through an arcuate slot 71 in the locking plate 64 and threaded into a flange 72 formed on the end of the extension 47. Such adjustment of the locking plate 64 varies the position at which the index holes 55 are located without, of course, varying the spacing between such index holes, so that the position at which the first knurled band occurs may be varied.

As heretofore mentioned, the knurling unit 24 is counterbalanced so that no undue strain will be placed on the indexing mechanism due to the weight of the knurling unit. For this purpose, a flexible cable 73 or the like is secured at one end to the knurling unit adjacent the arm 26 and passes upwardly over a pulley 74. The latter is mounted on axle 75 carried in spaced ears 76 formed on the cap 43. The cap 43 is centrally apertured as at 77 to permit the cable 73 to extend into the column, and the end of the cable within the column is secured to one end of a coiled spring 80. The latter extends for substantially the full length of the column and its lower end is secured to a crosspin 81 (see Fig. 3) provided in a collar 82. To prevent the spring from winding with the swinging motion of the knurling unit about the column, the collar 82 is held against an anti-friction bearing 83 mounted in the lower end of the column. The spring 80 is thus free to turn when the knurling unit 24 is turned about the column 23, and the tension of the spring 80 counterbalances the weight of the knurling unit.

The tool supporting arm 25, while constituting a portion of the knurling unit, is swingable relative to the hub portion 40 of the knurling unit so as to move the knurling tool into and out of contact with the outer periphery of the work piece. To this end, the tool supporting arm is carried on a pivot shaft 84 (see Figs. 2 and 4) mounted in a pair of spaced lugs 85 extending laterally from the hub portion 40 of the unit. The pivot shaft 84 is positioned parallel to the column 23 and the axis of the work piece. To permit the tool supporting arm 25 to swing freely, anti-friction bearings 86 are provided for the pivot shaft 84.

As heretofore mentioned, the knurling tool is in the form of a roller shown at 90 and is adapted to be applied to the outer periphery of the work piece. The knurling roller 90 is carried in a yoke 91, the shank of which extends into a tool holder 92. To permit adjustment of the yoke about the axis of its shank so that the knurling roller may accurately lie in a plane transverse to the axis of the work piece, the shank of the yoke 91 is flattened at one side (see Fig. 6), as shown at 93, and a pair of setscrews 94 are threaded into the work holder 92. By adjusting either of the setscrews 94 relative to the other one, the shank of the yoke 91 may be rotatably adjusted about its axis to move the knurling roller 90 into the proper plane.

The tool holder 92 is provided with a shoulder 95 adapted to abut against the free end of the arm 25, and has a shank 96 inserted within the arm 25. The shank 96 is also adapted to be adjusted about its axis for properly positioning the knurling roller 90, and for this purpose, the shank 96 is provided with a pair of generally opposite conical shaped indentations 97, as shown in Figs. 4 and 5. Threaded into the arm 25 is a pair of adjusting screws 100 having conical inner ends adapted to engage in the indentations 97. The indentations 97 are slightly larger than the conical ends of the screws 100 and are offset slightly from a true diametrically opposite position, so that by adjusting one screw inwardly and the other outwardly, the shank 96 of the tool holder may be rotated about its axis. Thus, by adjusting the tool holder about such axis and by adjusting the yoke 90 about the axis of its shank, the roller 90 may be accurately positioned in a plane perpendicular to the axis of the work piece. The tool supporting arm 25 and the tool holder 92 are beveled, as at 101, to provide clearance for the work pieces, as shown in Figs. 2 and 4.

Swinging movement of the tool supporting arm 25 about the pivot shaft 84 moves the knurling roller 90 into and out of operative engagement with the work piece, and power means is provided to effect such movement and thereby apply the knurling roller 90 with sufficient pressure to knurl the work piece. The power means in the present instance is in the form of a pneumatic actuator carried by the hub portion 40 of the knurling unit. As shown in Fig. 4, the pneumatic actuator comprises a cylinder 102 formed integrally with the hub portion 40 and provided with a liner 103. Closing one end of the cylinder is a cap 104. Air is supplied to the cylinder by means of a hose 105 (see Fig. 2) connected to the cap 104 and extending from the base 21 of the machine. Within the base is piping (not shown) including an air control valve, the control handle of which is shown at 106 in Figs. 3 and 4, with a connection 107 at the rear side of the base for attachment to a source of air under pressure. A gauge 110 may be mounted on the base to indicate the air pressure available for operating the pneumatic actuator. An air pressure regulating valve may be provided, such valve being adjustable by a control handle 108. Within the cylinder 102 is a piston 111 having a piston rod 112 adapted to engage a roller 113 mounted in one end of an arcuately shaped arm 114 extending from the tool supporting arm 25 adjacent the pivot shaft 84 around one side of the hub portion 40. Thus, when air pressure is admitted to the cylinder 102, the piston 111 causes a swinging movement of the tool supporting arm 25 to move the knurling roller 90 into contact with the periphery of the work piece. When air pressure is released from the cylinder 102, a plunger 115 mounted in the arm 25 and engaging the hub portion 40 at the opposite side thereof is pressed by a spring 116 to swing the tool supporting arm 25 away from the work piece and also to force the piston 111 in the cylinder 102 toward the cap 104.

Since the force applied through the knurling roller 90 against the work by the pneumatic actuator is substantial and would tend to cause the unit as a whole to swing about the column 23, the work supporting arm 26 carries means for supporting the work at the point of knurling, so as to provide a reactive force and thus eliminate any tendency of the forces exerted by the actuator to swing the unit about the column. To this end, the arm 26 carries an elongated plate 120 (see Figs. 1 and 2) with the plate extending from the end of the arm 26 into the open end of the work piece. On the free end of the plate 26 is rotatably mounted an anvil roller 121 positioned to lie in the same plane as the knurling roller 90 so that it engages the interior of the wall of the work piece directly at the point of application of the knurling roller. The plate 120 lies in a plane including the radius of the work piece, so that it provides a rigid support in a direction opposing the force applied to the work piece by the knurling roller 90. The plate 120, however, is relatively thin and may flex in a direction generally tangential to the rollers 90 and 121 so that, if the work piece is turned to such an extent that the roller 121 engages balancing pads, wrist pin supports or other inwardly protruding portions of the work, in turning the work piece about its axis, the arm 120 may flex in such tangential direction to permit the knurling roller to move beyond the anvil roller 121. Thus, the engagement of the anvil roller 121 with any inwardly extending portion of the work piece does not abruptly limit the extent to which the knurling roller may be moved relative to the work piece in a circumferential direction, and the knurled bands may, therefore, extend slightly farther than they would if the arm 120 were absolutely rigid and prohibited movement of the knurling roller beyond the point where the anvil roller 121 engages such a protuberance on the inner surface of the work piece.

The wall of a piston may vary in thickness to some extent, due to roughness or protuberances on the inside surface. Consequently, the spacing between the knurling roller 90 and the anvil roller 121 should be permitted to vary, although the pressure therebetween should be maintained substantially constant. The fact that the knurling roller 90 is held against the piston by pneumatic pressure accomplishes this result.

To permit the roller 121 to bear squarely against the internal surface of a work piece having considerable draft or taper, the arm 120 is fulcrumed on the end of the arm 26 by means of a pivot pin 122 fixed in the arm 26. The arm 120 thus is permitted to swing about the fulcrum 122 and, when adjusted to its desired position, may be locked in place by a manually operated clamping screw 123. The screw 123 is threaded into the end of the arm 26 and extends through an elongated or enlarged hole 124 in the plate 120 to permit limited swinging movement of the arm 120. To provide for rigid support of the arm 120 in its adjusted position, a backing screw 125 threaded into a lug 126 extending outwardly from the end of the arm 26 engages the end edge of the plate 120.

To provide for limiting the circumferential extent of the knurled bands, the work holder 22 includes adjustable means to limit the rotation thereof. To this end, a ring 130 is mounted about the adapter 33 under the work holder 22. The ring 130 is adapted to be secured to the adapter 33, for rotation therewith, by means of a spring-pressed plunger 131 radially mounted in the ring 130 and having a conical end 132 engageable with a conical depression in the adapter 33. The spring-pressed plunger 131 is preferably mounted in the front of the ring 130 while, at the rear thereof, there is mounted an outwardly extending bar 133. Mounted in the base 21 of the machine at points equally spaced on opposite sides of a line extending rearwardly from the center of the work holder 22, is a pair of bumpers or stops 134. Each bumper 134 is mounted on a bolt 135 (see Fig. 2) extending upwardly through a slot 136 in the base 21 and having a nut 137 threaded on the upper end of the bolt to clamp the bolt 135 in an adjusted position relative to the base. The bar 133 is of sufficient length to engage the stops 134 and thus limit the rotative movement of the work holder 22. In this manner, the circumferential length of the knurled bands is determined Obviously, to vary the length of such bands, the screws 135 are adjusted in equal amounts toward and from each other in the slots 136 in the base 21. The work holder is adapted to be rotated manually by means of a handle 137 radially mounted in the ring 130 adjacent the front thereof and to one side of the plunger 131. The jaws 32 of the chuck constituting the work holder are, as is usual, adapted to be adjusted to clamp the work piece in position by means of a socket screw 140 (see Fig. 1).

Since areas on opposite sides of the work pieces are to be knurled in this machine, and such areas are preferably of the same size circumferentially, the work holding structure is arranged to permit indexing of the work holder through 180° to present opposite sides of the work piece to the knurling roller without changing the position of the ring 130 carrying the bar 133, which limits the circumferential length of the knurled bands. The same setting of the stops 134 may thus be employed for both knurled areas on the work piece and, consequently, both will have exactly the same circumferential dimension. To this end, the ring 130 may be released from the adapter 33 to permit rotation of the work holder and adapter through 180°. The plunger 131 is normally held so that its tapered or beveled end 132 is locked in a depression in the adapter 33. For this purpose, the plunger 131 is provided with an outwardly extending stem 141 (see Fig. 2) and a hand screw 142 is threaded in the ring 130 to bear against the outer end of the stem 141. When the hand screw 142 is turned inwardly, it will hold the tapered end 132 of the plunger 131 in tight engagement with the depression in the adapter 33 and thus lock the ring to the adapter. When it is desired to rotate the work holder 22 through 180° relative to the ring 130, the screw 142 is moved outwardly sufficiently to permit the beveled end 132 of the plunger to be cammed out of the depression in the adapter 33. At a point 180° from the depression that the plunger was previously seated in, is another depression in the adapter 33 so that, as the work holder 22 is rotated, the plunger 131 will be forced into such other depression by means of a spring 143 bearing at one end against the plunger 131 and at the other end against the screw 142. The engagement of the plunger with such other depression will immediately inform the operator that the work holder has been moved through 180°, and the hand screw 142 may then be tightened to hold the work holder in its new position. The bar 133 in the ring 130 thus remains in the same position but with the work holder 22 indexed through 180° so that the knurling on the opposite side of the piston will be of the same circumferential dimension as the knurling on the first knurled side. The operating handle 137 for swinging a work holder 22 about its axis during the knurling operation also remains in the same place.

The machine may, if desired, be provided with a counter to indicate the number of work pieces knurled on the machine. To this end, the base 21 at its front is provided with an aperture 144 (see Figs. 1, 2 and 7) in its wall, over which is mounted a supporting plate 145. Secured to the supporting plate 145 by brackets 146 is a counter mechanism 147. The dials of the counter mechanism may be viewed through an aperture 150 provided in its supporting plate 145. The counter mechanism 147 has a rotatable operating member 151 at one end thereof and, in the present instance, is of a type which is actuable in half counts and thus requires two actuations of the operating member 151 for each number registered on its dials. To actuate the operating member 151, a plunger 152 is slidably mounted in the base with its front end engaging a notch in the operating member 151, as shown in Fig. 2. The plunger 152 is urged rearwardly by a spring 153 and is positioned radially of the shaft 34 carrying the adapter 33. The rear end of the plunger 152, which preferably is enlarged, engages cam means formed on the shaft 34. In the present instance, such cam means is provided by a pair of oppositely positioned grooves 154 cut in the shaft 34 and decreasing in depth to meet the outside diameter of the shaft at diametrically opposite points, as indicated at 155 in Fig. 7. The inner end of the plunger thus rides in the grooves 154 but, when the shaft is turned sufficiently, the portions 155 where the grooves run out to the outer diameter of the shaft have a camming action on the plunger and force it forwardly to actuate operating member 151 of the counter 147.

When one side of the work piece is knurled and the work holder 22 is rotated through 180° to present the opposite side of the work piece to the knurling roller, one of the portions 155 at the ends of the grooves 154 will engage the plunger 152 and cause actuation of the counter. After the second side of the work piece is knurled, the work holder 22 must be turned back to its initial position in order to bring the socket 140, by which the jaws are operated, to the front of the machine so that the work piece can be released. One or the other of the portions 155 will again actuate the counter so that two actuations of the counter are effected for each work piece placed therein. Since the counter is of the type which requires two actuations of its operating member 151 for registration of one digit on the dial of the counter, the counter, therefore, will give an accurate indication of the number of work pieces knurled in the machine. It will be noted that either direction of rotation of the shaft 34 will effect actuation of the counter so that it makes no difference whether the work holder is first turned in one direction and then in the same direction again, or in the opposite direction. In either instance, the counter will be properly actuated.

In use, assume that the work holder 22 is ready to receive a work piece. In that situation, the knurling unit 24 is adjacent the top of the column since the anvil roller 121 had to be moved above the previous work piece in order to permit removal of the latter. The work piece is then clamped in the jaws 32 and the knurling unit is lowered by turning the handwheel 51 to cause the pinion 45 to move along the rack 41. At the same time, the knurling unit 24 is swung about the column 23 so that the anvil roller 121 engages the inner periphery of the work. The knurling unit is lowered sufficiently to bring the knurling roller to the point where the first knurled band is to be placed immediately above the ring grooves, in the case of a piston. With the knurling unit in this position, the locking plate 64 is rocked about the index collar 54 sufficiently to cause the ball detent 56 to engage one of the holes or depressions 55 in the index column. The locking plate 64 is then located in its adjusted position by means of the screw 70. The plunger 60 bearing against the ball detent 56 is turned so that its cross pin lies in the notch 67, and the spring 61 thus exerts pressure on the ball 56 to hold it within a depression 55. The hand knob 57 is then tightened to clamp the shaft 46 against turning movement, thus holding the knurling unit in its vertically adjusted position.

After proper adjustments of the yoke 91 and tool holder 92 to place the knurling roller 90 in proper relation to the work piece, air is admitted to the cylinder 102 by means of the control handle 106. Admission of air to the cylinder swings the arm 25 counterclockwise, as viewed in Fig. 4, to cause the knurling roller 90 to engage the outer periphery of the work in operative relation thereto. Assuming that the stops 134 in the base of the machine for the bar 133 have been adjusted for the proper spacing, the work holder 22 is then swung back and forth by means of the handle 137 to cause the knurling roller 90 to move over the peripheral surface of the work piece. This places one band of knurling on the work piece at one side thereof.

To position the knurl for the next band of knurling, the hand knob 57 is loosened and the handwheel 51 turns sufficiently to bring the next depression 55 into engagement with the ball detent 56. The hand knob 57 is again locked and the operation repeated to knurl the next band. Such operation of the machine is continued until the desired dimension longitudinally of the work piece has been knurled. If, at the end of the piston, it is desired to shift the last band of knurling to a slightly different spacing, as indicated at 19 in Fig. 9, the plunger 60, when that point is reached, is pulled outwardly and turned through 90° so that its cross pin 66 no longer engages the notch 67. Pressure of the spring 61 is thereby removed from the ball detent 56, and the shaft 46 may be turned by means of the handwheel 51 to the desired position and locked in such position by means of the hand knob 57. It will be noted, however, that this does not change the setting of the locking plate 64 with relation to the index collar 54.

For knurling the opposite side of the piston, the knurling unit is moved upwardly, if necessary to avoid obstructions within the piston, by means of the handwheel. The hand screw 142 at the front of the ring 130 under the work holder 22 is then turned outwardly so as to release the plunger 131 from locking engagement with the adapter 33. The work holder 22 is thus free to be rotated until the plunger 131 engages the depression in the opposite side of the adapter 33, and the hand screw 142 is again locked. The knurling unit is then lowered by means of the handwheel 51 to knurl the first band on the newly presented side of the work piece. This band will be in exactly the same position as the first band on the first side, except circumferentially spaced 180° therefrom because of the fact that the locking plate 64 has been held in the same position relative to the indexing collar 54 as for the previous knurling operation. The indexing mechanism may, therefore, be utilized to properly space the knurled bands on the second side of the work piece. The circumferential length of the knurled bands is also exactly the same as on the first side, since the adjustment of the stops 134 has not been changed.

The counter 147 will, as previously described, register one digit on its dial since the plunger 152 will be actuated twice, once when the work holder is indexed to present the second side of the work piece to the knurl and again when the work piece is brought back to its original position to permit removal thereof from the chuck jaws 32.

I claim:

1. A machine for knurling generally cylindrical hollow work pieces, comprising a base, a work holder rotatably mounted on said base, a column mounted on said base on an axis parallel to the axis of said work holder, a knurling head mounted on said column and having a tool supporting arm and a work supporting arm extending laterally from said head toward the work, a knurling tool carried by said tool supporting arm, an anvil carried by said work supporting arm, one of said arms being rigid with said head and the other arm being swingably mounted on said head for movement in a plane perpendicular to the axis of the work, and means reacting against said head for swinging said other arm toward said one arm to grip the wall of the work piece between said knurling tool and said anvil, said knurling head being freely rotatable on said column for equalizing effect to permit the work to be gripped by said knurling tool and anvil by operation of said means irrespective of the position of the gripped portion circumferentially of the column.

2. A machine for knurling the skirt of a piston of the character described, comprising a base, a work holder rotatably mounted on said base, a column extending upwardly from said base with its axis parallel to the axis of the work holder, a knurling head rotatably mounted on said column, said head having a tool supporting arm extending laterally therefrom toward the work and having a knurling tool carried on the end of said arm for engaging the outer peripheral surface of the piston skirt, said head also having a work supporting arm extending therefrom toward the work above the tool supporting arm and having at its end an anvil supporting arm extending downwardly therefrom and having an anvil for engaging the interior of the piston skirt, said work supporting arm being rigid with said head and said tool supporting arm being swingably mounted on said head for movement in a plane perpendicular to the axis of the work, and means reacting against said head for swinging said tool supporting arm toward the work to grip the piston skirt between said knurling tool and said anvil, said knurling head being freely rotatable on said column to permit the work to be gripped by the knurling tool and anvil by operation of said means irrespective of the position of the gripped portion circumferentially of the column.

3. The machine of claim 1 further characterized in that said column comprises a cylindrical tube extending vertically from said base, said knurling head is both rotatably and slidably mounted on said tube, a counterbalance is positioned within said tube, a pulley is located at the upper end of said tube and has a flexible connector extending thereover and connected at its ends to said knurling head and said counterbalance, and said pulley is mounted for swinging movement about the axis of said tube to permit the pulley to swing with said knurling head.

4. The machine of claim 1 further characterized in that said knurling head is both slidably and rotatably mounted on said column, and said knurling head includes an indexing device for moving said knurling head longitudinally of said column comprising a rack extending longitudinally along the outer surface of said column and held against longitudinal movement relative thereto but rotatable about said surface with said knurling head, and a manually operable pinion carried by said knurling head and meshing with said rack.

5. The machine of claim 1 further characterized in that said column comprises a cylindrical tube, said knurling head is both rotatably and slidably mounted on said tube, a counterbalance is positioned in said tube, a pulley is located at the upper end of said tube and has a flexible connector extending thereover and connected at its ends to said knurling head and said counterbalance, a cap is rotatably mounted on the upper end of said tube and supports said pulley to permit the pulley to swing about the axis of the tube with said knurling head, and an indexing device is provided for moving said knurling head longitudinally of said tube, comprising a rack extending longitudinally along the outer surface of said tube and secured at its upper end to said cap whereby said rack is held against longitudinal movement but is rotatable about said surface with said knurling head, and a manually operable pinion carried by said knurling head and meshing with said rack.

RALPH R. TEETOR.

References Cited in the file of this patent

UNITED STATES PATENTS

| Number | Name | Date |
|---|---|---|
| 1,032,408 | Himoff | July 16, 1912 |
| 1,839,775 | Rottler | Jan. 5, 1932 |
| 1,907,664 | Preston et al. | May 9, 1933 |
| 2,081,079 | Worden | May 18, 1937 |
| 2,083,775 | Carroll | June 15, 1937 |
| 2,338,186 | LeTourneau | Jan. 4, 1944 |
| 2,378,261 | Turney | June 12, 1945 |